United States Patent
Okamoto et al.

(10) Patent No.: US 9,843,661 B2
(45) Date of Patent: Dec. 12, 2017

(54) MOBILE ELECTRONIC DEVICE, SECURITY CONTROL METHOD, AND SECURITY CONTROL CODE

(71) Applicant: KYOCERA Corporation, Kyoto-shi, Kyoto (JP)

(72) Inventors: Katsuhiro Okamoto, Setagaya-ku (JP); Haruyoshi Oshinome, Nagaokakyo (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/489,861

(22) Filed: Apr. 18, 2017

(65) Prior Publication Data

US 2017/0302773 A1    Oct. 19, 2017

(30) Foreign Application Priority Data

Apr. 18, 2016    (JP) .................................. 2016-083152

(51) Int. Cl.
*H04M 1/66* (2006.01)
*H04M 1/68* (2006.01)
*H04M 3/16* (2006.01)

(52) U.S. Cl.
CPC .................................... *H04M 1/66* (2013.01)

(58) Field of Classification Search
CPC .. H04M 1/66; H04M 1/7253; H04M 1/72519; H04M 2250/02; H04W 4/008; H04W 76/023; H04W 4/20; H04W 84/20
USPC ............................. 455/411, 26.1, 574, 343.2
See application file for complete search history.

(56) References Cited

U.S. PATENT DOCUMENTS

| | | | |
|---|---|---|---|
| 6,151,493 A | 11/2000 | Sasakura et al. | |
| 6,314,283 B1 * | 11/2001 | Fielden | H04M 1/673 455/410 |
| 6,504,480 B1 * | 1/2003 | Magnuson | G07C 9/00142 340/5.1 |
| 6,956,480 B2 * | 10/2005 | Jespersen | G08B 13/1418 340/539.1 |
| 7,054,594 B2 * | 5/2006 | Bloch | G06F 1/163 340/572.1 |
| 9,386,401 B2 * | 7/2016 | Gold | H04W 4/008 |
| 9,460,686 B2 * | 10/2016 | Oshinome | G09G 5/00 |
| 9,491,570 B2 * | 11/2016 | Nishimura | H04M 1/72519 |
| 9,642,072 B2 * | 5/2017 | Okamoto | H04W 48/16 |
| 2012/0225639 A1 * | 9/2012 | Gazdzinski | G06Q 10/08 455/410 |

(Continued)

FOREIGN PATENT DOCUMENTS

| JP | 11-88499 A | 3/1999 |
|---|---|---|
| WO | 2015/189967 A1 | 12/2015 |

OTHER PUBLICATIONS

Extended European Search Report in EP Application No. 17166842. 9, dated Sep. 11, 2017. 7pp.

*Primary Examiner* — Marceau Milord
(74) *Attorney, Agent, or Firm* — Hauptman Ham, LLP

(57) ABSTRACT

A mobile electronic device includes a first input unit configured to receive input of information for cancelling a security lock state in which security lock is effective, a second input unit configured to receive input of biological information for cancelling the security lock state, and a controller configured to set a sleeping-time operation control mode corresponding to a sleeping time of a user according to an operation of the user.

5 Claims, 4 Drawing Sheets

(56) References Cited

U.S. PATENT DOCUMENTS

| | | |
|---|---|---|
| 2015/0278498 A1 | 10/2015 | Hong et al. |
| 2016/0088146 A1* | 3/2016 | Ying ................ H04M 1/72569 455/550.1 |
| 2017/0116402 A1 | 4/2017 | Hirabayashi et al. |
| 2017/0180984 A1* | 6/2017 | Thomas ................ H04W 12/08 |

* cited by examiner

MOBILE ELECTRONIC DEVICE, SECURITY CONTROL METHOD, AND SECURITY CONTROL CODE

CROSS-REFERENCE TO RELATED APPLICATION(S)

The present application claims priority to and incorporates by reference the entire contents of Japanese Patent Application No. 2016-083152 filed in Japan on Apr. 18, 2016.

BACKGROUND

1. Field

The present application relates to a mobile electronic device, a security control method, and a security control code.

2. Description of the Related Art

Conventionally, in a mobile electronic device such as a smartphone, a function for limiting operations on the mobile electronic device (hereinafter, "security lock") is incorporated in order to prevent erroneous operations, unauthorized use by a third party, and the like.

SUMMARY

A mobile electronic device according to one aspect includes a first input unit configured to receive input of information for cancelling a security lock state in which security lock is effective, a second input unit configured to receive input of biological information for cancelling the security lock state, and a controller configured to set a sleeping-time operation control mode corresponding to a sleeping time of a user according to an operation of the user. If the sleeping-time operation control mode is set, the controller permits cancelling of the security lock state based on information input through the first input unit and prohibits cancelling of the security lock state based on biological information input through the second input unit. If the sleeping-time operation control mode is not set, the controller permits both cancelling of the security lock state based on information input through the first input unit and cancelling the security lock state based on biological information input through the second input unit.

A security control method according to one aspect is executed by a mobile electronic device including an acceleration sensor configured to detect an acceleration value, a first input unit configured to receive input of information for cancelling a security lock state in which security lock is effective, and a second input unit configured to receive input of biological information for cancelling the security lock state. The security control method includes the step of, if a sleeping-time operation control mode is set, permitting cancelling of the security lock state based on information input through the first input unit and prohibiting cancelling of the security lock state based on biological information input through the second input unit. The security control method includes the step of, if the sleeping-time operation control mode is not set, permitting both cancelling of the security lock state based on information input through the first input unit and cancelling the security lock state based on biological information input through the second input module.

A non-transitory computer readable recording medium according to one aspect stores thereon a security control code for causing a mobile electronic device including an acceleration sensor configured to detect an acceleration value, a first input unit configured to receive input of information for cancelling a security lock state in which security lock is effective, and a second input unit configured to receive input of biological information for cancelling the security lock state to execute the following steps. The security control code causes the mobile electronic device, if a sleeping-time operation control mode is set, to execute the step of permitting cancelling of the security lock state based on information input through the first input unit and prohibiting cancelling of the security lock state based on biological information input through the second input unit. The security control code causes the mobile electronic device, if the sleeping-time operation control mode is not set, to execute the step of permitting both cancelling of the security lock state based on information input through the first input unit and cancelling the security lock state based on biological information input through the second input unit.

DETAILED DESCRIPTION

There is room for improvement with regard to the unlocking procedure for unlocking a security lock state in which the security lock described above is effective. A plurality of embodiments for carrying out a mobile electronic device, a security control method, and a security control code according to the present application will be described below in detail with reference to the accompanying drawings. In the following descriptions, as an example of the mobile electronic device according to the present application, a smartphone is exemplified. In the following descriptions, like reference signs may refer to identical constituent elements. In addition, redundant descriptions may be omitted.

Figure 1:
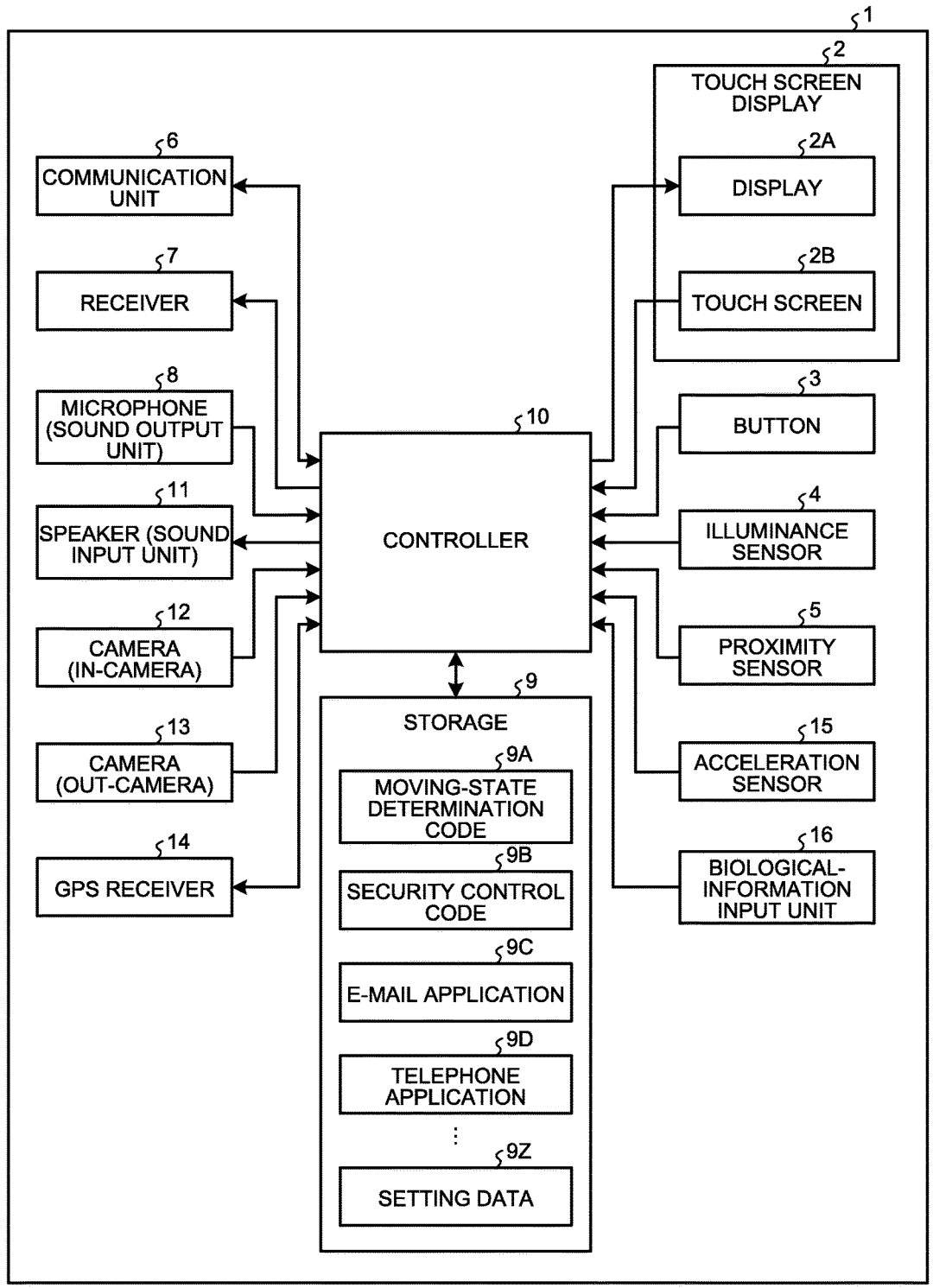
FIG. 1 is a block diagram illustrating a functional configuration of a smartphone according to an embodiment.

With reference to FIG. 1, an example of a functional configuration of a smartphone 1 according to an example of a plurality of embodiments is described. FIG. 1 is a block diagram illustrating a functional configuration of the smartphone 1.

As illustrated in FIG. 1, the smartphone 1 includes a touch screen display 2, one or plural buttons 3, an illuminance sensor 4, a proximity sensor 5, a communication unit 6, a receiver 7, a microphone 8, a storage 9, a controller 10, a speaker 11, a camera 12, a camera 13, a GPS receiver 14, an acceleration sensor 15, and a biological-information input unit 16. In the following descriptions, the smartphone 1 is sometimes referred to as "own device".

The touch screen display 2 includes a display 2A and a touch screen 2B. The display 2A and the touch screen 2B can be positioned, for example, to overlap with each other, to be side by side, or to be apart from each other. When the display 2A and the touch screen 2B are positioned to overlap with each other, for example, one or plural sides of the display 2A do not need to be along with any side of the touch screen 2B.

The display 2A includes a display device such as a liquid crystal display (LCD), an organic electro-luminescence display (OELD), or an inorganic electro-luminescence display (IELD). The display 2A can display, on a screen, objects such as characters, images, signs, and figures. The screen including objects such as characters, images, signs, and figures displayed on the display 2A includes a screen referred to as "lock screen", a screen referred to as "home screen", and an application screen to be displayed during execution of an application. The home screen may be also referred to as "desktop", "standby screen", "idle screen", "application list screen", or "launcher screen".

The touch screen 2B can detect contact therewith or proximity thereto made with one or plural fingers, one or plural pens, or one or plural stylus pens. The touch screen 2B can detect the position on the touch screen 2B when one or plural fingers, one or plural pens, or one or plural stylus pens have contacted therewith or have become proximate thereto. The fingers, pens, and stylus pens detected by the touch screen 2B are sometimes referred to as "finger". The position detected by the touch screen 2B where the finger has touched or become proximate is sometimes referred to as "detected position". The touch screen 2B can notify the controller 10 of the contact of the finger on the touch screen 2B along with the detected position. Operations that can be performed with the touch screen 2B can be performed with the touch screen display 2 including the touch screen 2B. In other words, operations performed with the touch screen 2B can be performed with the touch screen display 2. Operations on the touch screen 2B can be paraphrased as operations on the touch screen display 2 including the touch screen 2B. Operations on the touch screen 2B can be paraphrased as operations on the smartphone 1 including the touch screen 2B. In some embodiments, the touch screen 2B can employ, as its detection method, an electrostatic capacitance method, a resistance film method, or a load sensing method as appropriate. In the embodiments, the touch screen 2B is an example of a first input unit.

The controller 10 can determine the type of gestures, based on at least one of the number of times of contact detected with the touch screen 2B, a position where contact is detected, a change of the position where the contact is detected, the length of time during which the contact is detected, a time interval between one detection of contact to another detection thereof, and the number of times of detecting contact. Operations that can be performed by the controller 10 can be performed by a smartphone 1 including the controller 10. In other words, operations performed by the controller 10 can be performed by the smartphone 1. A gesture is an operation performed with a finger on the touch screen 2B. Operations performed on the touch screen 2B can be performed on the touch screen display 2 including the touch screen 2B. Examples of gestures determined by the controller 10 through the touch screen 2B include, but are not limited to, touch, long touch, release, swipe, tap, double tap, long tap, drag, flick, pinch-in, pinch-out, etc.

The button 3 receives operation input from a user. Upon reception of operation input from a user, the button 3 notifies the controller 10 of a fact that the button 3 has received operation input. The number of the button 3 can be either singular or plural. The button 3 can include numerical keys or QWERTY keys. In the embodiments, the button 3 is an example of the first input unit.

The illuminance sensor 4 can detect illuminance. The illuminance is a value of a luminous flux incident on a unit area of a measuring surface of the illuminance sensor 4. The illuminance sensor 4 can be used, for example, to adjust the brightness of the display 2A.

The proximity sensor 5 can detect the presence of a neighboring object in a noncontact manner. The proximity sensor 5 detects the presence of an object based on a change of a magnetic field, a change of a feedback time of an ultrasonic reflected wave, or the like. The proximity sensor 5 can be used, for example, to detect a fact that a user's face is approximate to the display 2A. The illuminance sensor 4 and the proximity sensor 5 can be configured to be one sensor. The illuminance sensor 4 can be also used as a proximity sensor.

The communication unit 6 can perform wireless communication. The communication unit 6 supports the wireless communication standards. Examples of the wireless communication standards supported by the communication unit 6 include, but are not limited to, 2G, 3G, and 4G cellular phone communication standards, communication standards of Near Field Communication, etc. Examples of the cellular phone communication standards include, but are not limited to, LTE (Long Term Evolution), W-CDMA (Wideband Code Division Multiple Access), WiMAX® (Worldwide Interoperability for Microwave Access), CDMA2000, PDC (Personal Digital Cellular), GSM® (Global System for Mobile Communications), PHS (Personal Handy-phone System), etc. Examples of the communication standards of Near Field Communication include, but are not limited to, IEEE802.11 (IEEE is an abbreviation for The Institute of Electrical and Electronics Engineers, Inc.), Bluetooth®, IrDA (Infrared Data Association), NFC (Near Field Communication), WPAN (Wireless Personal Area Network), etc. Examples of the communication standards of the WPAN include, but are not limited to, ZigBee®, DECT (Digital Enhanced Cordless Telecommunications), Z-Wave, WiSun (Wireless Smart Utility Network), etc. The communication unit 6 can support one or plural communication standards described above.

The receiver 7 can output a sound signal transmitted from the controller 10 as sound. The receiver 7 can output, for example, sound of a motion picture reproduced by the smartphone 1, music sound, and a voice of a counterpart at the time of calling. The microphone 8 converts a voice of a user and the like into a sound signal and transmits the sound signal to the controller 10. In the embodiments, the microphone 8 is an example of a second input unit.

The storage 9 can store therein codes and data. The storage 9 can be used as a work area in which a processing result of the controller 10 is temporarily stored. The storage 9 can include a semiconductor storage medium and an arbitrary non-transitory storage medium such as a magnetic storage medium. The storage 9 can include plural types of storage media. The storage 9 can include a combination of a storage medium such as a memory card, an optical disk, or a magnetooptical disk and a reader of the storage medium. The storage 9 can include a storage device to be used as a temporary storage area such as a RAM (Random Access Memory).

The codes stored in the storage 9 include an application executed in a foreground or a background, and a basic code that supports operations of the application. An application screen is displayed on the display 2A, for example, when the application is executed in a foreground. The basic code includes an OS, for example. The application and the basic code can be installed in the storage 9 through wireless communication via the communication unit 6 or via a non-transitory storage medium.

The storage 9 can store therein a moving-state determination code 9A, a security control code 9B, an e-mail application 9C, a telephone application 9D, setting data 9Z, and the like.

The moving-state determination code 9A can provide a function of determining the moving state of a user of the own device based on an acceleration value. Specifically, the moving-state determination code 9A measures vibrations and movement acting on the own device based on the direction and magnitude of the acceleration acquired from the acceleration sensor 15. The moving-state determination code 9A compares measurement results of the vibrations and movement acting on the own device and reference data related to the vibrations and movement acting on the own device in respective moving state to determine the moving state of the user of the own device. The moving state includes a state in which the user is not moving and a state in which the user is moving. The state in which the user is not moving includes a state in which the own device is placed on a stationary object and a stopping state in which the user holding the own device is stopping. The state in which the user is moving includes a walking state in which the user holding the own device is walking, a running state in which the user holding the own device is running, and an on-board state in which the user holding the own device is riding on a bicycle, in a car, or in a train.

The security control code 9B can provide a function of cancelling a security lock state in which security lock is effective. Specifically, when it is determined that the user is not moving, the security control code 9B permits both cancelling of the security lock state based on information input through the touch screen 2B, the button 3, and the like and cancelling of the security lock state based on biological information input through the biological-information input unit 16. On the other hand, when it is determined that the user is moving, the security control code 9B prohibits cancelling of the security lock state based on information input through the touch screen 2B, the button 3, and the like, and permits only cancelling of the security lock state based on biological information input through the biological-information input unit 16.

The e-mail application 9C can provide an e-mail function for composition, transmission, reception, display, and the like of an e-mail. The telephone application 9D can provide a call function for calling via wireless communication.

The setting data 9Z is configured to include various types of data to be used for processing on the smartphone 1. The setting data 9Z includes information for determining whether the own device is in a moving state. The setting data 9Z includes reference data related to vibrations and movement acting on the own device in respective moving states. The reference data related to the vibrations and movement acting on the own device in respective moving states can include an acceleration pattern constituted by the direction and magnitude of the acceleration acting on the smartphone 1 or by time series variations of the direction and magnitude of the acceleration. The setting data 9Z includes biological authentication information that authenticates biological information input from the biological-information input unit 16. The biological information can include information related to a face, a fingerprint, an earprint, a vein pattern, an iris, a retina, and a voiceprint.

The controller 10 can integrally control the operations of the smartphone 1 to realize various types of functions. The controller 10 includes an arithmetic processor. Examples of the arithmetic processor can include, but are not limited to, a CPU (Central Processing Unit), an SoC (System-on-a-Chip), an MCU (Micro Control Unit), an FPGA (Field-Programmable Gate Array), a coprocessor, etc. The SoC can be integrated with other constituent elements such as the communication unit 6. The controller 10 is an example of a controller.

Specifically, the controller 10 executes commands included in the code stored in the storage 9, while referring to the data stored in the storage 9 as required. The controller 10 controls a functional unit according to the data and the commands, thereby realizing the various types of functions. Examples of the functional unit include, but are not limited to, at least one of the display 2A, the communication unit 6, the microphone 8, the speaker 11, the GPS receiver 14, etc. The controller 10 may change the control according to a detection result of a detector. Examples of the detector include, but are not limited to, at least one of the touch screen 2B, the button 3, the illuminance sensor 4, the proximity sensor 5, the microphone 8, the camera 12, the camera 13, the acceleration sensor 15, the biological-information input unit 16, etc.

The controller 10 executes the moving-state determination code 9A to realize the processes described below in cooperation with the acceleration sensor 15. The controller 10 measures vibrations and movement acting on the own device based on the direction and magnitude of the acceleration acquired from the acceleration sensor 15. The controller 10 compares measurement results of the vibrations and movement acting on the own device and reference data related to the vibrations and movement acting on the own device in respective moving states to determine the moving state of the user of the own device.

The controller 10 executes the security control code 9B to realize the processes described below. When it is determined that the user is not moving based on a processing result obtained by the moving-state determination code 9A, the controller 10 permits both cancelling of the security lock state based on information input through the touch screen 2B, the button 3, and the like and cancelling of the security lock state based on biological information input through the biological-information input unit 16. On the other hand, when it is determined that the user is moving based on a processing result obtained by the moving-state determination code 9A, the controller 10 prohibits cancelling of the security lock state based on information input through the touch screen 2B, the button 3, and the like, and permits only cancelling of the security lock state based on biological information input through the biological-information input unit 16.

The speaker 11 can output a sound signal transmitted from the controller 10 as sound. The speaker 11 can output, for example, ringtones and music. One of the receiver 7 and the speaker 11 can also execute functions of the other one.

The camera 12 and the camera 13 can convert a shot image into an electric signal. The camera 12 can be an in-camera that shoots an object facing the display 2A. The camera 13 can be an out-camera that shoots an object facing an opposite surface of the display 2A. The camera 12 and the camera 13 can be mounted on the smartphone 1 in a state of being functionally and physically integrated, as a camera unit that can be used by switching the in-camera and the out-camera.

The GPS receiver 14 can receive a radio signal of a predetermined frequency band from a GPS satellite. The GPS receiver 14 performs demodulation processing on the received radio signal and transmits the processed signal to the controller 10. The GPS receiver 14 supports arithmetic processing of the current position of the smartphone 1.

The acceleration sensor 15 can detect the direction and magnitude of an acceleration (an acceleration value) acting on the own device. The controller 10 can determine the moving state of the user of the own device based on the direction and magnitude of the acceleration detected by the acceleration sensor 15 or an acceleration pattern including time series variations of the direction and magnitude of acceleration.

The biological-information input unit 16 receives input of biological information for cancelling the security lock state. The biological-information input unit 16 can be configured, for example, as a unit including a sensor that retrieves information as biological information, a fingerprint sensor that retrieves fingerprint data, an earprint sensor that retrieves earprint data, and a vein sensor that retrieves vein pattern data. The biological-information input unit 16 can retrieve, from a facial image acquired by the camera 12, information as biological information by extracting feature points of a face, an iris, and a retina. The biological-information input unit 16 can also retrieve frequency patterns of voices input from the microphone 8 as biological information.

The controller 10 can use respective outputs from the acceleration sensor 15 and other sensors (not illustrated) such as an orientation sensor in combination. By using the respective outputs from the acceleration sensor 15 and other sensors in combination, the smartphone 1 can execute control that accurately reflects the movement of the own device by the controller 10. The acceleration sensor 15 and other sensors can be used as one motion sensor.

The smartphone 1 can also include a connector, an orientation sensor, a vibrator, and the like other than the respective functional units described above. The connector includes a terminal to which other devices are connected. The connector can include a general-purpose terminal such as a USB (Universal Serial Bus), an HDMI® (High-Definition Multimedia Interface), Light Peak (Thunderbolt®), and an earphone/microphone connector. The connector can be a dedicated terminal such as a Dock connector. Examples of the devices connected to the connector include, but are not limited to, an external storage, a speaker, a communication device, etc. The orientation sensor can measure the orientation of the smartphone 1 by measuring geomagnetism, for example. The orientation sensor can be either a biaxial type or a triaxial type. The orientation sensor can measure the direction and magnitude of a magnetic field. The vibrator vibrates a part or the whole of the smartphone 1. In order to generate vibrations, the vibrator includes, for example, a piezoelectric device or an eccentric motor. The smartphone 1 includes a functional unit inevitably used to maintain the functions of the smartphone 1 such as a battery, and a controller inevitably used to realize the control of the smartphone 1.

Figure 2:
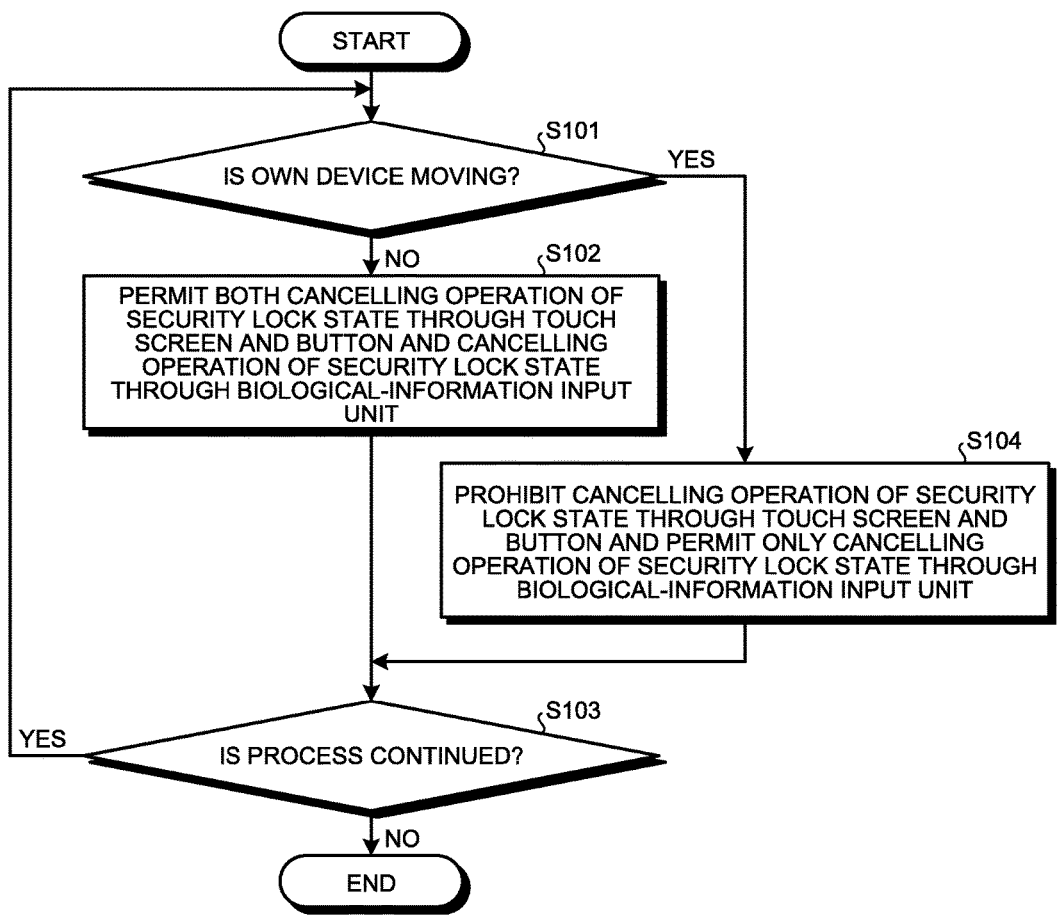
FIG. 2 is a flowchart illustrating an example of processes performed by the smartphone according to the embodiment.

An example of processes performed by the smartphone 1 according to the embodiment is described with reference to FIG. 2. FIG. 2 is a flowchart illustrating an example of processes performed by the smartphone 1 according to the embodiment. The process illustrated in FIG. 2 is realized as the controller 10 executes the moving-state determination code 9A and the security control code 9B stored in the storage 9.

An example of a flow of a process performed by the smartphone 1 is described with reference to FIG. 2. As illustrated in FIG. 2, the controller 10 determines whether a user of the own device is moving based on an acceleration value detected by the acceleration sensor 15 (Step S101).

As a result of the determination, when the user of the own device is not moving (No at Step S101), the controller 10 permits both a cancelling operation of the security lock state through the touch screen 2B and the button 3 and a cancelling operation of the security lock state through the biological-information input unit 16 (Step S102).

Subsequently, the controller 10 determines whether the process is continued (Step S103).

As a result of the determination, when the process is continued (Yes at Step S103), the controller 10 returns to the process procedure at Step S101 described above.

On the other hand, as a result of the determination, when the process is not continued (No at Step S103), the controller 10 finishes the process illustrated in FIG. 2.

At Step S101 described above, as a result of the determination, when the user of the own device is moving (Yes at Step S101), the controller 10 prohibits a cancelling operation of the security lock state through the touch screen 2B and the button 3 and permits only a cancelling operation of the security lock state through the biological-information input unit 16 (Step S104), and the controller 10 proceeds to the determination at Step S103 described above.

The purpose of prohibiting the cancelling operation of the security lock state through the touch screen 2B and the button 3 in a case where the user of the smartphone 1 is moving as described above is as follows. That is, when the user is moving, there is a high probability that the user is away from home, so that the prohibiting of the cancelling operation prevents the user of the smartphone 1 from encountering dangers such as collision on other people, a bicycle, a car, an obstacle, and the like due to a lack of attentiveness caused by an input operation on the smartphone 1 while moving.

In the above embodiment, there has been described an example in which processes related to the cancelling method of the security lock state of the smartphone 1 according to a determination result of the moving state of the user of the smartphone 1 are performed. In the following descriptions, as another embodiment, there is described an example in which, when the user of the smartphone 1 is moving, the own device performs processes related to the cancelling method of the security lock state of the own device according to the current position of the user.

When the user of the own device is moving, the security control code 9B can provide a function of further determining whether the current position of the user of the own device is a predetermined position and performing processes related to the cancelling method of the security lock state according to a result of the determination. Specifically, when the current position of the user of the own device is a predetermined position, the security control code 9B permits both cancelling of the security lock state based on information input through the touch screen 2B, the button 3, and the like and cancelling of the security lock state based on biological information input through the biological-information input unit 16. On the other hand, when the current position of the user of the own device is not in a predetermined position, the security control code 9B prohibits cancelling of the security lock state based on information input through the touch screen 2B, the button 3, and the like and permits only cancelling of the security lock state based on biological information input through the biological-information input unit 16. The predetermined position corresponds to, for example, a location where the level of security does not need to be maintained high, such as the position of the user's home. The predetermined position can be arbitrarily set by the user of the smartphone 1. When the user's home is set as the predetermined position, the security control code 9B can determine whether the current position of the user is his home based on whether there is any detection of a wireless LAN router that is installed in the home, or can determine whether the current position of the user is his home based on the signal from the GPS receiver 14.

By executing the security control code 9B, the controller 10 determines whether the current position of the user of the own device is a predetermined position and performs processes related to the cancelling method of the security lock state according to the result of the determination. Specifically, when the user of the own device is not moving, as a result of determination whether the current position of the user of the own device is a predetermined position (for example, the user's home), when the current position of the user is the predetermined position, the controller 10 permits both cancelling of the security lock state based on information input through the touch screen 2B, the button 3, and the like and cancelling of the security lock state based on biological information input through the biological-information input unit 16. On the other hand, as a result of determination whether the current position of the user of the own device is a predetermined position (for example, the user's home), when the current position of the user is not in the predetermined position, the controller 10 prohibits cancelling of the security lock state based on information input through the touch screen 2B, the button 3, and the like and permits only cancelling of the security lock state based on biological information input through the biological-information input unit 16.

Figure 3:
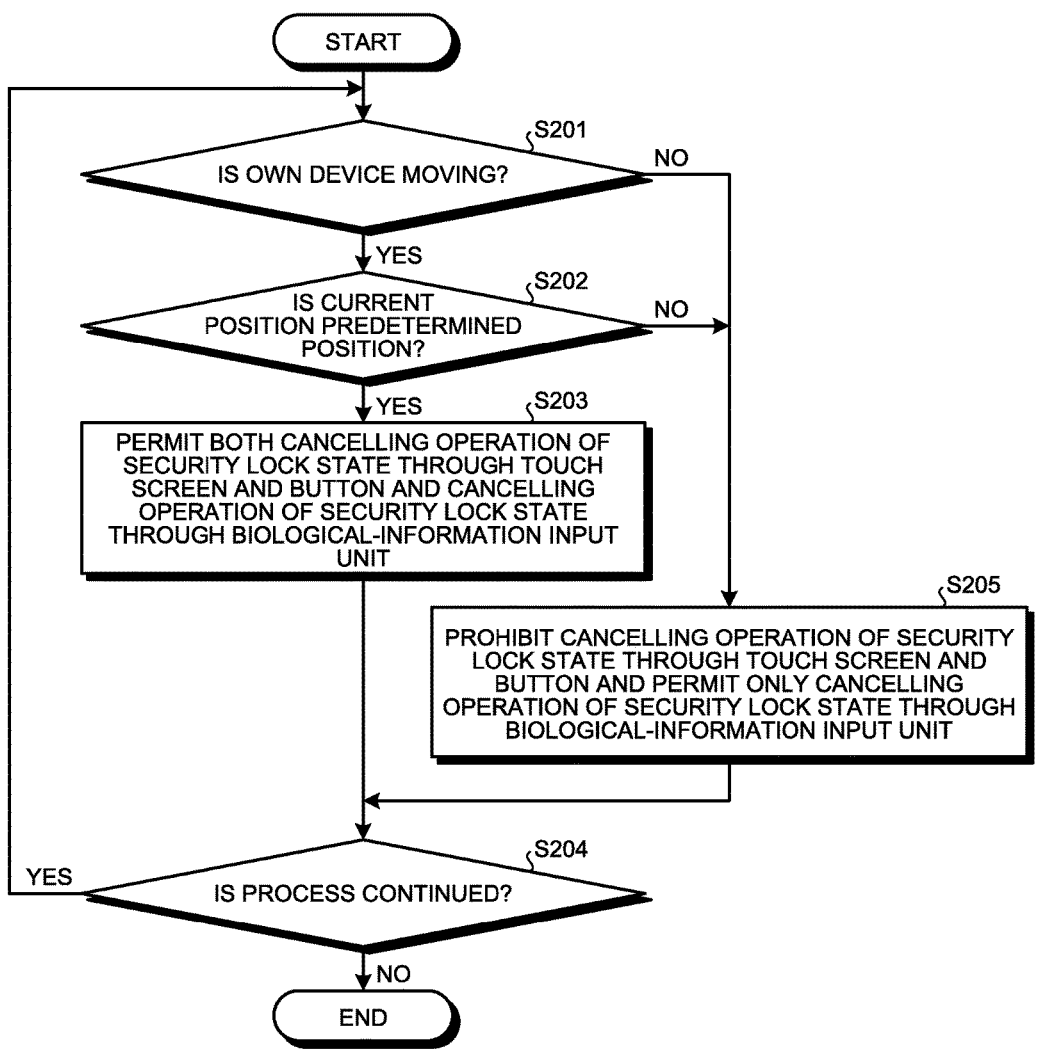
FIG. 3 is a flowchart illustrating an example of processes performed by a smartphone according to another embodiment.

An example of a flow of a process performed by the smartphone 1 is described with reference to FIG. 3. FIG. 3 is a flowchart illustrating an example of processes performed by a smartphone according to another embodiment.

As illustrated in FIG. 3, the controller 10 determines whether a user of the own device is moving based on an acceleration value detected by the acceleration sensor 15 (Step S201).

As a result of the determination, when the user of the own device is moving (Yes at Step S201), the controller 10 determines whether the current position of the user of the own device is a predetermined position (Step S202).

As a result of the determination, when the current position of the user of the own device is a predetermined position (Yes at Step S202), the controller 10 permits both a cancelling operation of the security lock state through the touch screen 2B and the button 3 and a cancelling operation of the security lock state through the biological-information input unit 16 (Step S203).

Subsequently, the controller 10 determines whether the process is continued (Step S204).

As a result of the determination, when the process is continued (Yes at Step S204), the controller 10 returns to the process procedure at Step S201 described above.

Meanwhile, as a result of the determination, when the process is not continued (No at Step S204), the controller 10 finishes the process illustrated in FIG. 3.

At Step S201 described above, as a result of the determination, when the own device is not moving (No at Step S201), the controller 10 prohibits the cancelling operation of the security lock state through the touch screen 2B and the button 3 and permits only the cancelling operation of the security lock state through the biological-information input unit 16 (Step S205), and the controller 10 proceeds to the determination at Step S204 described above.

At Step S202 described above, as a result of the determination, when the current position of the user of the own device is not in a predetermined position (No at Step S202), the controller 10 proceeds to the process procedure at Step S205 described above.

The purpose of permitting the cancelling operation of the security lock state through the touch screen 2B and the button 3 even when the user of the smartphone 1 is moving, for example, in his home is as follows. That is, when the user is at home, even if the user has a lack of attentiveness caused by an input operation on the smartphone 1 while moving, because it is the user's home, there is a less probability that the user of the smartphone 1 encounters dangers, so that convenience for the user is prioritized.

In the embodiment described above, there has been described an example in which processes related to the cancelling method of the security lock state of the smartphone 1 according to the determination result of the moving state and the current position of the user of the smartphone 1 are performed. In the following descriptions, as still another embodiment, there is described an example in which processes related to the cancelling method of the security lock state of the smartphone 1 are performed according to an operation setting made by the user of the smartphone 1.

The security control code 9B can provide a function of setting a sleeping-time operation control mode that is an operation control setting of the own device corresponding to the sleeping time of a user according to operations of the user of the own device. Except for specific cases, the sleeping-time operation control mode is a setting for basically controlling operations of the smartphone 1 in order to refrain outputting of a ringtone and vibrations of a vibrator. Examples of the specific cases include, for example, incoming calls from the same telephone number for more than a predetermined number of times within a predetermined time period and incoming calls from specific telephone numbers. The security control code 9B determines whether the sleeping-time operation control mode is set in the own device, and according to a result of the determination, the security control code 9B can provide a function of performing processes related to the cancelling method of the security lock state of the own device. Specifically, during a time period when the sleeping-time operation control mode is set, the security control code 9B prohibits cancelling of the security lock state based on biological information input through the biological-information input unit 16 and permits only cancelling of the security lock state based on information input through the touch screen 2B, the button 3, and the like. On the other hand, if the sleeping-time operation control mode is not set, the security control code 9B permits both cancelling of the security lock state based on biological information input through the biological-information input unit 16 and cancelling of the security lock state based on information input through the touch screen 2B, the button 3, and the like.

The controller 10 determines whether the sleeping-time operation control mode is set to the own device by executing the security control code 9B, and according to a result of the determination, the controller 10 performs processes related to the cancelling method of the security lock state of the own device. Specifically, if the sleeping-time operation control mode is set, the controller 10 prohibits cancelling of the security lock state based on biological information input through the biological-information input unit 16 and permits only cancelling of the security lock state based on information input through the touch screen 2B, the button 3, and the like. On the other hand, if the sleeping-time operation control mode is not set, the controller 10 permits both cancelling of the security lock state based on biological information input through the biological-information input module 16 and cancelling of the security lock state based on information input through the touch screen 2B, the button 3, and the like.

Figure 4:
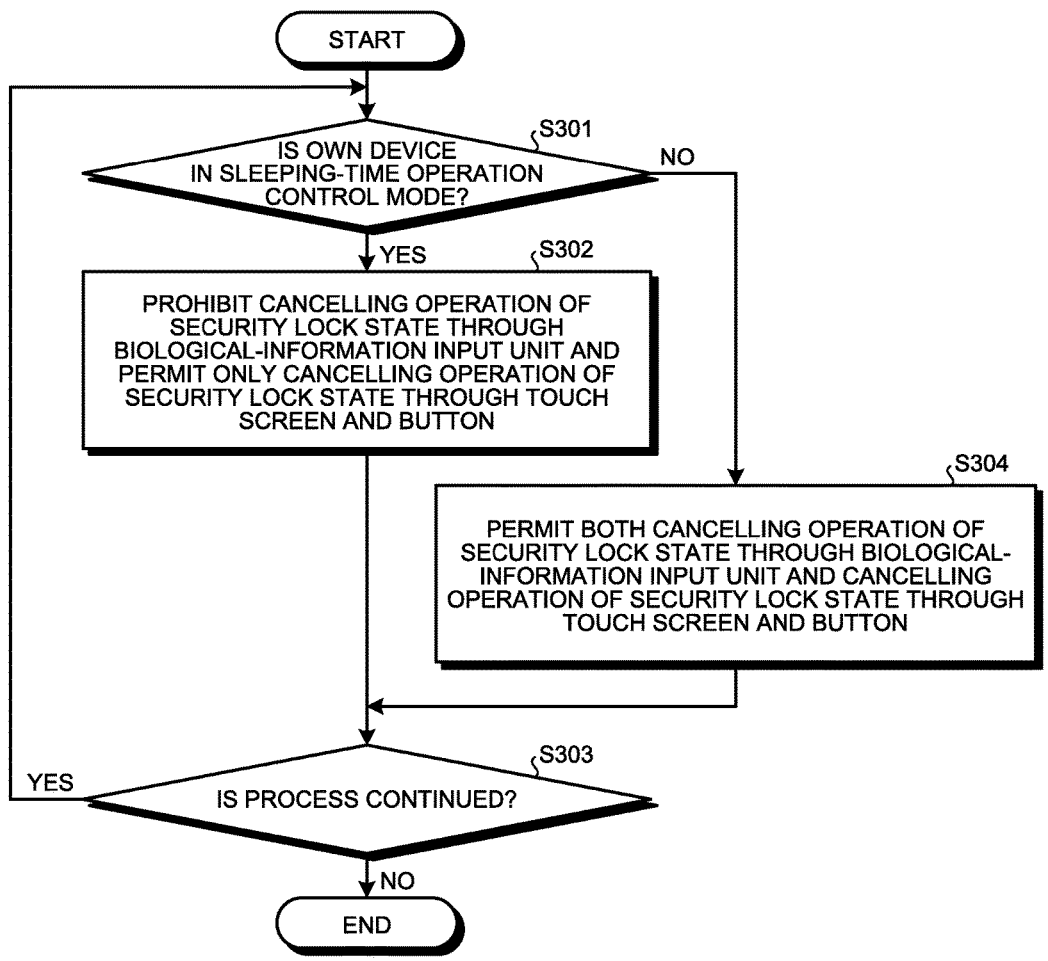
FIG. 4 is a flowchart illustrating an example of processes performed by a smartphone according to still another embodiment.

An example of a flow of a process performed by the smartphone 1 is described with reference to FIG. 4. FIG. 4 is a flowchart illustrating an example of processes performed by a smartphone according to still another embodiment.

As illustrated in FIG. 4, the controller 10 determines whether the sleeping-time operation control mode is set (Step S301).

As a result of the determination, if the sleeping-time operation control mode is set (Yes at Step S301), the controller 10 prohibits a cancelling operation of the security lock state through the biological-information input unit 16 and permits only a cancelling operation of the security lock state through the touch screen 2B and the button 3 (Step S302).

Subsequently, the controller 10 determines whether the process is continued (Step S303).

As a result of the determination, when the process is continued (Yes at Step S303), the controller 10 returns to the process procedure at Step S301 described above.

Meanwhile, as a result of the determination, when the process is not continued (No at Step S303), the controller 10 finishes the process illustrated in FIG. 4.

At Step S301 described above, as a result of the determination, if the sleeping-time operation control mode is not set (No at Step S301), the controller 10 permits both a cancelling operation of the security lock state through the biological-information input unit 16 and a cancelling operation of the security lock state through the touch screen 2B and the button 3 (Step S304), and the controller 10 proceeds to the determination at Step S303 described above.

As described above, the purpose of prohibiting the cancelling of the security lock state with biological information when the sleeping-time operation control mode is set is to prevent the security lock state from being canceled by a third party using the fingerprint of a finger of the user of the smartphone 1 while the user is sleeping.

The process in FIG. 4 described above can be applied to the process in FIG. 3 described above. In the process in FIG. 3, the smartphone 1 permits cancelling of the security lock state with biological information when, for example, the user of the own device is moving in his home. In the process in FIG. 4, the smartphone 1 prohibits cancelling of the security lock state with biological information if the sleeping-time operation control mode is set. In this connection, for example, the smartphone 1 can preferentially execute either the cancelling method in FIG. 3 or the cancelling method in FIG. 4. That is, the smartphone 1 can prohibit cancelling of the security lock state with biological information if the sleeping-time operation control mode is set, even if the user of the own device is moving in his home. Meanwhile, the smartphone 1 can permit cancelling of the security lock state with biological information when the user of the own device is moving in his home, even if the sleeping-time operation control mode is set.

The processes illustrated in FIGS. 2 to 4 can also be applied to various types of electronic devices having a security lock function incorporated therein, other than the smartphone 1.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile electronic device, comprising:
a first input unit configured to receive input of information for cancelling a security lock state in which security lock is effective;
a second input unit configured to receive input of biological information for cancelling the security lock state; and
a controller configured to set a sleeping-time operation control mode corresponding to a sleeping time of a user according to an operation of the user, wherein
if the sleeping-time operation control mode is set, the controller permits cancelling of the security lock state based on information input through the first input unit and prohibits cancelling of the security lock state based on biological information input through the second input unit, and
if the sleeping-time operation control mode is not set, the controller permits both cancelling of the security lock state based on information input through the first input unit and cancelling the security lock state based on biological information input through the second input unit.

2. The mobile electronic device according to claim 1, wherein the first input unit includes at least one of a touch screen, numerical keys, and QWERTY keys.

3. The mobile electronic device according to claim 1, wherein the second input unit detects any of a face, a fingerprint, an earprint, a vein pattern, an iris, a retina, and a voiceprint as the biological information.

4. A security control method to be executed by a mobile electronic device including an acceleration sensor configured to detect an acceleration value, a first input unit configured to receive input of information for cancelling a security lock state in which security lock is effective, and a second input unit configured to receive input of biological information for cancelling the security lock state, the security control method comprising the steps of:
if a sleeping-time operation control mode is set, permitting cancelling of the security lock state based on information input through the first input unit and prohibiting cancelling of the security lock state based on biological information input through the second input unit; and
if the sleeping-time operation control mode is not set, permitting both cancelling of the security lock state based on information input through the first input unit and cancelling the security lock state based on biological information input through the second input module.

5. A non-transitory computer readable recording medium storing thereon a security control code for causing a mobile electronic device including an acceleration sensor configured to detect an acceleration value, a first input unit configured to receive input of information for cancelling a security lock state in which security lock is effective, and a second input unit configured to receive input of biological information for cancelling the security lock state to execute the steps of:
if a sleeping-time operation control mode is set, permitting cancelling of the security lock state based on information input through the first input unit and prohibiting cancelling of the security lock state based on biological information input through the second input unit; and if the sleeping-time operation control mode is not set, permitting both cancelling of the security lock state based on information input through the first input unit and cancelling the security lock state based on biological information input through the second input unit.

* * * * *